Patented June 19, 1923.

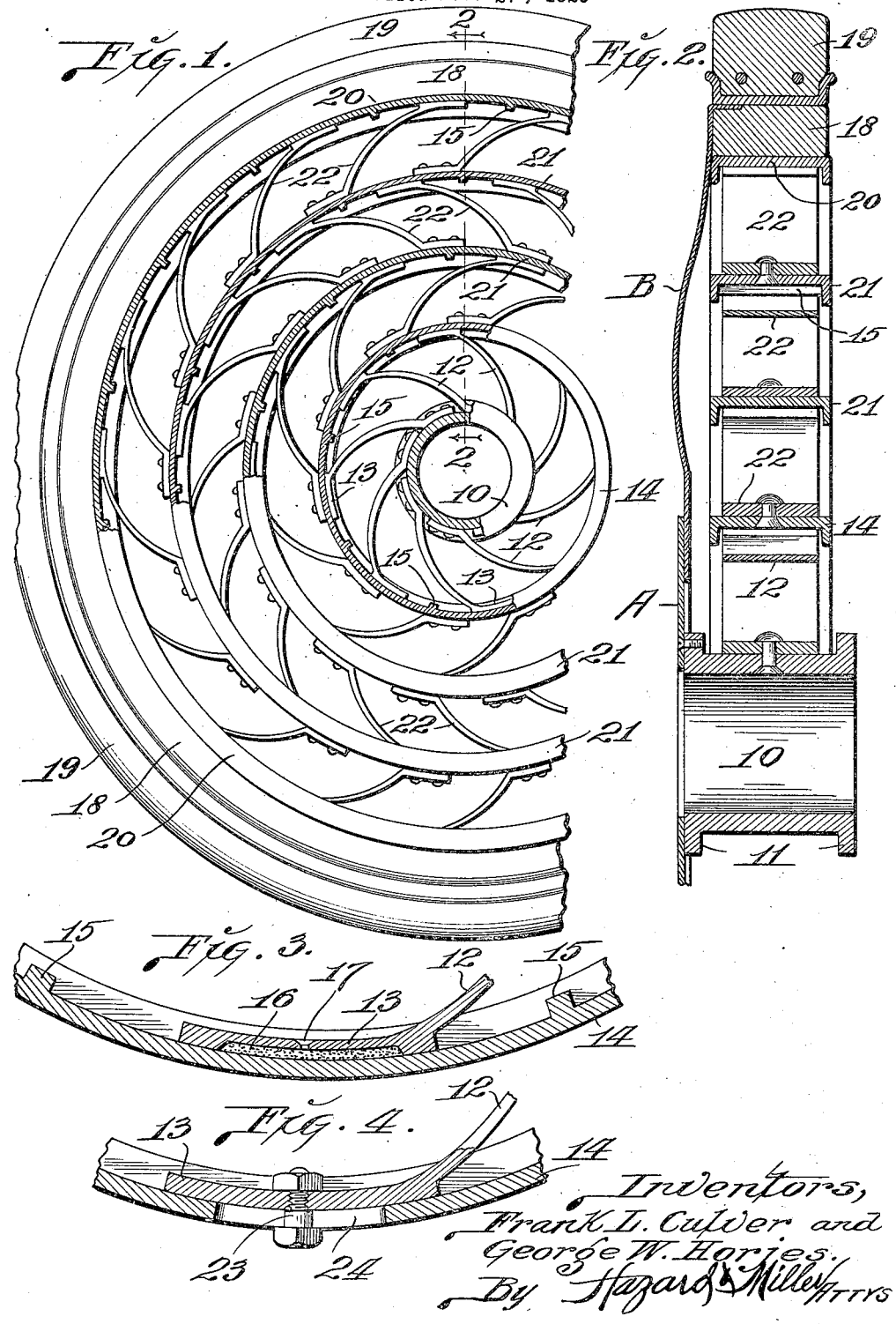

1,459,363

UNITED STATES PATENT OFFICE.

FRANK L. CULVER AND GEORGE W. HORJES, OF LOS ANGELES, CALIFORNIA; SAID HORJES ASSIGNOR TO SAID CULVER.

SPRING WHEEL.

Application filed November 27, 1920. Serial No. 426,834.

*To all whom it may concern:*

Be it known that we, FRANK L. CULVER and GEORGE W. HORJES, citizens of the United States, residing at Los Angeles, in the county of Los Angeles and State of California, have invented new and useful Improvements in Spring Wheels, of which the following is a specification.

Our invention relates to spring wheels, the principal object of our invention being to provide a relatively simple, strong and durable vehicle wheel that will be highly effective in absorbing practically all of the shocks and vibrations that may be received by the rim and tire portion of the wheel in its passage over the ground or roadway, thereby preventing undue vibration from being transmitted to the axle to which the wheel is applied, and in turn, from said axle to the body of the vehicle.

To attain the foregoing objects, we purpose to arrange between the hub and the rim portion of the wheel, one or more rings or annular supporting members and to arrange between the latter and the hub and wheel rim, a plurality of relatively short springs, the latter being of such size and arrangement as to produce the desired degree of resiliency, and at the same time to provide the necessary strength and stability.

With the foregoing and other objects in view, our invention consists in certain novel features of construction and arrangement of parts that will be hereinafter more fully described and claimed and illustrated in accompanying drawings, in which:

Fig. 1 is a side elevational view of a spring wheel constructed in accordance with our invention, with parts thereof broken away and in section.

Fig. 2 is an enlarged vertical section taken approximately on the line 2—2 of Fig. 1.

Fig. 3 is an enlarged detail section taken lengthwise through one of the annular supporting members and through the central portion of the shoe that is formed on the end of each spring, and which shoe bears on said annular supporting member.

Fig. 4 is a detail section taken lengthwise through one of the annular supporting members and showing an arrangement that may be utilized for providing a sliding connection between the shoe on the end of the spring and said annular support.

Referring by numerals to the accompanying drawing which illustrates a practical embodiment of our invention, 10 designates a short tubular member preferably of metal which serves as the hub of our improved wheel, and formed integral with, or fixed to said hub near its ends are outwardly presented annular flanges 11.

Fixed in any suitable manner to the periphery of this hub, between its flanges, are the inner ends of a series of springs 12, that are curved lengthwise and the outer ends of said springs terminate in arcuate shoes 13, the outer faces of which latter bear against the inner face of a ring or annular supporting member 14, and which latter is preferably in the form of a continuous channel with its side flanges inwardly presented.

Formed on the inner face of the ring or annular support 14 are lugs or transversely disposed ribs 15, the same serving as stops to limit the sliding movement of the shoes 13 in both directions upon the annular supporting member.

The inner faces of the shoes 13 are preferably recessed as designated by 16, in order to receive a suitable lubricant or graphite, and in order that the latter may be readily introduced into the recesses or pockets, each shoe is provided with a relatively small aperture 17 that leads through the wall of said shoe into the recess or lubricant pocket. (See Fig. 3.)

The rim portion of our improved wheel comprises a felly 18, preferably of wood and upon which is mounted, in any suitable manner, a solid tire 19, of rubber or like resilient material, and secured to the inner face or periphery of the felly is a channel shaped ring 20.

Interposed between the annular supporting member 14 and the rim of the wheel are one or more concentrically arranged annular supports 21, the same being channel shape in cross section, and arranged between the latter and said annular supporting members and between members 14 and 20 are springs 22 that are identically the same in structure as the springs 12 previously described.

Thus our improved wheel is made up of a hub, a rim member, a plurality of channel shaped rings or annular supports arranged between said hub and rim and a plurality of annular sets or series of springs arranged between the hub, said annular supports and the rim, with the inner ends of said springs fixed to said hub and to the annular supports and with the outer ends of said springs in sliding engagement with the corresponding annular supports.

By virtue of this construction, the wheel has great resiliency and all shocks and vibrations that the rim portion of the wheel receives in its passage over the ground or roadway will be absorbed by the springs arranged between the rim portion of the wheel and the hub. Consequently the axle journaled in said hub and the load supported by said axle will be yieldingly supported in the desired manner.

While we have shown three rings or annular supports disposed between the hub and rim portion of the wheel, this number can be increased or decreased as desired and in accordance with the weight that is to be supported by the wheel.

During the flexing actions of the springs 12 the shoes 13 on the outer ends thereof will slide downwardly and forwardly upon the end faces of the annular supporting members, and while so doing they will be lubricated by the lubricating material contained in the pockets 16, and in the event of abnormal movement of the yielding parts of the wheel, the ends of the shoes will bear against the stops 15 on the annular supporting members, thereby providing a safeguard to prevent breakage of the springs.

Ordinarily the flanges on the side edges of the annular supports 14 and 21 are sufficient to retain the shoes in proper position upon said annular members, but if it is desired to connect the outer ends of the springs to the annular supporting members, screws or bolts such as 23 may be seated in the shoes on the ends of the springs, said screws or bolts projecting through longitudinally disposed slots such as 24 that are formed in the web portions of the annular supporting members. (See Fig. 4.)

This arrangement permits the shoes on the the ends of the springs to slide freely for a limited distance in both directions and at the same time ties the parts together so as to prevent their separation in the event that the parts of the wheel between the hub and rim are subjected to undue lateral stress.

If desired, one or both side faces of our improved wheel may be inclosed with disc shaped sections of sheet metal and, as illustrated in Fig. 2, a relatively small disc A may be fitted to one end of the hub 10 in any desirable manner and a marginal portion of this inner disc may overlie the inner edge of a larger disc B, the outer edge of the latter being secured in any suitable manner to the felly 18. When the wheel is thus enclosed the springs and annular supporting members are prevented from becoming soiled and discolored and likewise they are prevented from injury and breakage as a result of being struck by relatively small extraneous objects.

To provide greatest strength and to secure the greatest degree of resiliency in our improved wheel, it is desirable that the springs of one annular series be oppositely disposed with respect to the next adjacent series. That is, where the inner series of springs that are attached to the hub are generally curved toward the left hand or anti-clockwise, the springs of the next adjacent outer series should be disposed so that they project generally toward the right hand or clockwise.

A spring wheel of our improved construction is comparatively simple, has a relatively high degree of resiliency, can be made in various sizes to suit different requirements, is very strong and durable and its use entirely eliminates the requirement for pneumatic tires, and which latter are subject to deflation as a result of punctures.

It will be readily understood that minor changes in the size, form and construction of the various parts of our improved spring wheel may be made and substituted for those herein shown and described without departing from the spirit of our invention, the scope of which is set forth in the appended claims.

We claim as our invention:

1. In a spring wheel, a hub, a rim, an annular supporting member concentrically disposed between said hub and rim which annular supporting member is provided on its side edges with inwardly projecting flanges, a series of springs having their inner ends fixed to said hub and their outer ends having sliding engagement with the inner face of said annular supporting member between the flanges thereof, springs having their inner ends fixed to said annular supporting member and their outer ends having sliding engagement with the rim, stops on said annular supporting member and the rim for limiting the sliding engagement of the outer ends of the springs thereupon and the inner faces of the end portions of said springs being provided with lubricant receiving recesses.

2. A spring wheel comprising a plurality of annuli of graduating diameters arranged between the rim and hub, and springs secured to certain of the annuli and having sliding contact with the other annuli.

3. A spring wheel comprising a plurality of annuli of graduating diameters arranged between the rim and hub, and resilient members secured to certain of the annuli and having sliding contact with the other annuli.

4. A spring wheel comprising a plurality of annuli of graduating diameters arranged between the rim and hub, springs secured to certain of the annuli and having sliding contact with the other annuli, and shoes on the free ends of the springs having lubricant receiving pockets.

5. A spring wheel comprising a plurality of annuli, said annuli being disposed concentrically of each other and of graduating diameters, springs interposed between adjacent annuli and the hub and rim of the wheel with the springs between any two annuli, the hub and adjacent annulus, or the rim and adjacent annulus being reversely disposed with respect to the springs between adjacent annuli.

6. A spring wheel comprising a plurality of annuli of graduating diameters interposed between the rim and hub of the wheel and normally disposed concentrically of each other, and spirally disposed springs arranged in series between adjacent annuli, between the rim and adjacent annulus, and between the hub and adjacent annulus.

7. A spring wheel comprising a plurality of annuli of graduating diameters interposed between the rim and hub of the wheel and normally disposed concentrically of each other, and spirally disposed springs arranged in series between adjacent annuli, between the rim and adjacent annulus, and between the hub and adjacent annulus, the springs of adjacent series being reversely disposed with respect to each other.

8. In a spring wheel, a hub, an annular member disposed about said hub, which member is provided on its sides with inwardly projecting parallel flanges, an annular member arranged on the inner face of the rim of the wheel, which annular member is provided at its sides with inwardly projecting flanges, a series of springs having their inner ends fixed to said hub, a series of springs secured to the annular member that surrounds the hub, the outer ends of which springs bear against the inner face of the annular member that is secured to the wheel rim, shoes on the outer ends of said springs, which shoes bear against the inner face of the annular member between the flanges thereof and there being recesses formed in the outer faces of all of said shoes, which recesses are adapted to receive lubricant.

9. In a spring wheel, a hub, a rim, a plurality of concentrically arranged annular members disposed between said hub and rim, a series of springs between the hub and the innermost annular member, a series of springs between each annular member and the next adjacent larger annular member, a series of springs between the largest annular member and said rim, the springs of adjacent series being reversely disposed and the inner ends of all of said springs being fixed to the parts upon which they bear and their outer ends having sliding engagement with the parts upon which they bear.

In testimony whereof we have signed our names to this specification.

FRANK L. CULVER.
GEO. W. HORJES.